US011288651B2

(12) United States Patent
Narita et al.

(10) Patent No.: US 11,288,651 B2
(45) Date of Patent: *Mar. 29, 2022

(54) COMMODITY SALES DATA PROCESSING APPARATUS AND CONTROL PROGRAM

(71) Applicant: TOSHIBA TEC KABUSHIKI KAISHA, Tokyo (JP)

(72) Inventors: Masahiro Narita, Yokohama Kanagawa (JP); Hikaru Komiyama, Yokohama Kanagawa (JP); Atsushi Otsuka, Ota Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/951,905

(22) Filed: Nov. 18, 2020

(65) Prior Publication Data
US 2021/0073774 A1    Mar. 11, 2021

Related U.S. Application Data

(63) Continuation of application No. 16/712,603, filed on Dec. 12, 2019, now Pat. No. 10,872,325.

(30) Foreign Application Priority Data

Mar. 4, 2019  (JP) .............................. JP2019-038431

(51) Int. Cl.
*G06Q 20/20* (2012.01)
*G07G 1/12* (2006.01)
(52) U.S. Cl.
CPC ......... *G06Q 20/208* (2013.01); *G06Q 20/202* (2013.01); *G06Q 20/209* (2013.01); *G07G 1/12* (2013.01); *G06K 2209/17* (2013.01)

(58) Field of Classification Search
None
See application file for complete search history.

(56) References Cited

U.S. PATENT DOCUMENTS 9,881,289 B2    1/2018  Cummins et al.
10,872,325 B2 * 12/2020  Narita .................. G06Q 20/208
(Continued)

FOREIGN PATENT DOCUMENTS

JP      2018-055507 A     4/2018

OTHER PUBLICATIONS

Notice of Allowance issued in U.S. Appl. No. 16/712,603 dated Aug. 18, 2020.

*Primary Examiner* — Kristy A Haupt
(74) *Attorney, Agent, or Firm* — Foley & Lardner LLP

(57) ABSTRACT

A commodity sales data processing apparatus registers, if a code obtained by a receiver is a first code for identifying a commodity, sales data of the commodity identified by the first code. The apparatus acquires, if the code input by the receiver is a second code for identifying a commodity group ordered via a network, data of the commodity group identified by the second code from a saving destination where data of ordered commodities is saved. The apparatus registers, based on the data acquired from the saving destination, sales data of a commodity included in the commodity group identified by the second code. The apparatus executes settlement processing based on the sales data of the commodity identified by the first code and the commodity included in the commodity group identified by the second code.

20 Claims, 8 Drawing Sheets

(56) References Cited

U.S. PATENT DOCUMENTS

2008/0242357 A1 10/2008 White
2019/0188669 A1 6/2019 Escribano et al.
2019/0318336 A1 10/2019 Mihara

* cited by examiner

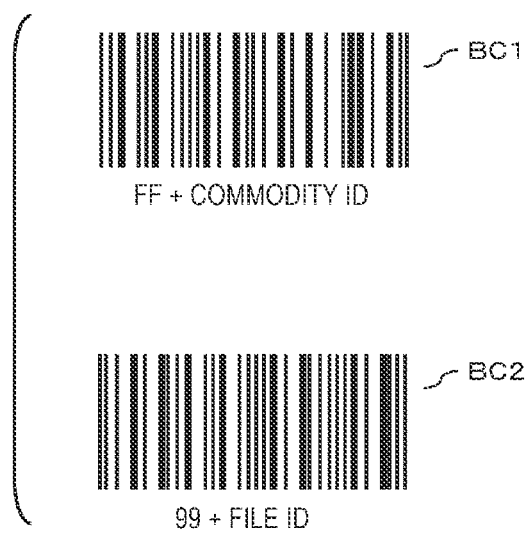

FIG. 8

| REGISTRATION | | | MMDDYYYY hh:mm |
|---|---|---|---|
| COMMODITY NAME | PRICE | NUMBER OF ITEMS | AMOUNT |
| | | | |
| | TOTAL | | |

FIG. 9

| REGISTRATION | | | MMDDYYYY hh:mm |
|---|---|---|---|
| COMMODITY NAME | PRICE | NUMBER OF ITEMS | AMOUNT |
| ⓣ AAAAA | 1,500 | 1 | 1,500 |
| | TOTAL | 1 ITEM | 1,500 YEN |

FIG. 10

| | REGISTRATION | | | MMDDYYYY hh:mm | — 60C |
|---|---|---|---|---|---|
| | COMMODITY NAME | PRICE | NUMBER OF ITEMS | AMOUNT | |
| 63T — (T) | AAAAA | 1,500 | 1 | 1,500 | |
| | | CALLING — 64 | | | — 61 |
| | TOTAL | | 1 ITEM | 1,500 YEN | — 62 |

FIG. 11

| | REGISTRATION | | | MMDDYYYY hh:mm | — 60D |
|---|---|---|---|---|---|
| | COMMODITY NAME | PRICE | NUMBER OF ITEMS | AMOUNT | |
| 63T — (T) | AAAAA | 1,500 | 1 | 1,500 | |
| 63T — (T) | BBBBB | 1,000 | 1 | 1,000 | |
| 63D — (D) | CCCCC | 2,500 | 1 | 2,500 | — 61 |
| 63T — (T) | DDDDD | 600 | 1 | 600 | |
| | TOTAL | | 4 ITEMS | 5,600 YEN | — 62 |

FIG. 12

|  |  |  |  |
|---|---|---|---|
|  | MMDDYYYY |  | hh:mm |
| 71T — ⓣ | AAAAA | 1 | ¥1,500 |
| 71T — ⓣ | BBBBB | 1 | ¥1,000 |
| 71D — ⓓ | CCCCC | 1 | ¥2,500 |
| 71T — ⓣ | DDDDD | 1 | ¥600 |
|  | TOTAL | 4 ITEMS | 5,600 YEN |
|  | DEPOSIT |  | 10,000 YEN |
|  | CHANGE |  | 4,400 YEN |

70

COMMODITY SALES DATA PROCESSING APPARATUS AND CONTROL PROGRAM

CROSS-REFERENCE TO RELATED APPLICATIONS

This application is a continuation of U.S. application Ser. No. 16/712,603 filed Dec. 12, 2019, which is based upon and claims the benefit of priority from Japanese Patent Application No. 2019-038431, filed on Mar. 4, 2019, the entire contents of which are incorporated herein by reference.

FIELD

Embodiments described herein generally relate to a commodity sales data processing apparatus and a control program for causing a computer to function as the commodity sales data processing apparatus.

BACKGROUND

In recent years, online supermarkets have become an increasingly popular forum for conducting sales. In an online supermarket, a retailer such as a supermarket opens a virtual store on the Internet. The retailer sells commodities both at a real store and the virtual store (via the online supermarket). Services for enabling a user of the online supermarket to receive, in the real store, a commodity ordered from the virtual store also have become popular. Such services have an advantage that an amount of time a user spends shopping can be reduced because the user can receive the ordered commodity simply by visiting the real store in a time period convenient for the user (e.g., by telling a store clerk a content of an order).

However, if the user purchases, separately from the ordered commodity, a commodity sold in the real store, the purchase of the commodity sold in the real store is a separate transaction. Therefore, the user has to separately perform settlement of the ordered commodity purchased in the virtual store and settlement of the commodity purchased in the real store. This creates an inconvenience which may deter the user from using a virtual store and/or a real store.

DESCRIPTION OF THE DRAWINGS

FIG. 4 is a schematic diagram illustrating an example of a barcode corresponding to a commodity identifier (ID) and a barcode corresponding to a file ID;

FIG. 5 is a schematic diagram illustrating an area configuration of a transaction memory;

FIG. 8 is a diagram illustrating a display example of a registration screen;

FIG. 9 is a diagram illustrating another display example of the registration screen;

FIG. 10 is a diagram illustrating another display example of the registration screen;

FIG. 11 is a diagram illustrating another display example of the registration screen; and FIG. 12 is a diagram illustrating a printing example of a receipt.

DETAILED DESCRIPTION

Embodiments described herein provide a commodity sales data processing apparatus that can settle, as one transaction, a commodity ordered via a virtual store (e.g., online supermarket, merchant, etc.) and a commodity purchased in a real store (e.g., physical store, brick and mortar store, etc.). In this way, embodiments described herein can encourage users to make purchases either via the network or the real store.

According to an embodiment, a commodity sales data processing apparatus includes an input section, a first registering section, an acquiring section, a second registering section, and a settling section. The input section inputs a code. The first registering section registers, if the code input by the input section is a first code for identifying a commodity, sales data of the commodity identified by the first code. The acquiring section acquires, if the code input by the input section is a second code for identifying a commodity group ordered via a network, data of the commodity group identified by the second code from a saving destination where data of ordered commodities is saved. The second registering section registers, based on the data acquired by the acquiring section, sales data of a commodity included in the commodity group identified by the second code. The settling section executes settlement processing based on the sales data of the commodity registered by the first registering section and the commodity registered by the second registering section.

An embodiment of a commodity sales data processing apparatus that can settle, as one transaction, a commodity ordered via a network and a commodity purchased in a real store is explained below with reference to the drawings.

In this embodiment, functions of the commodity sales data processing apparatus are realized by a point of sale (POS) terminal of a real store that introduces a service for enabling a user to receive, in the real store, a commodity ordered in an online supermarket.

Figure 1:
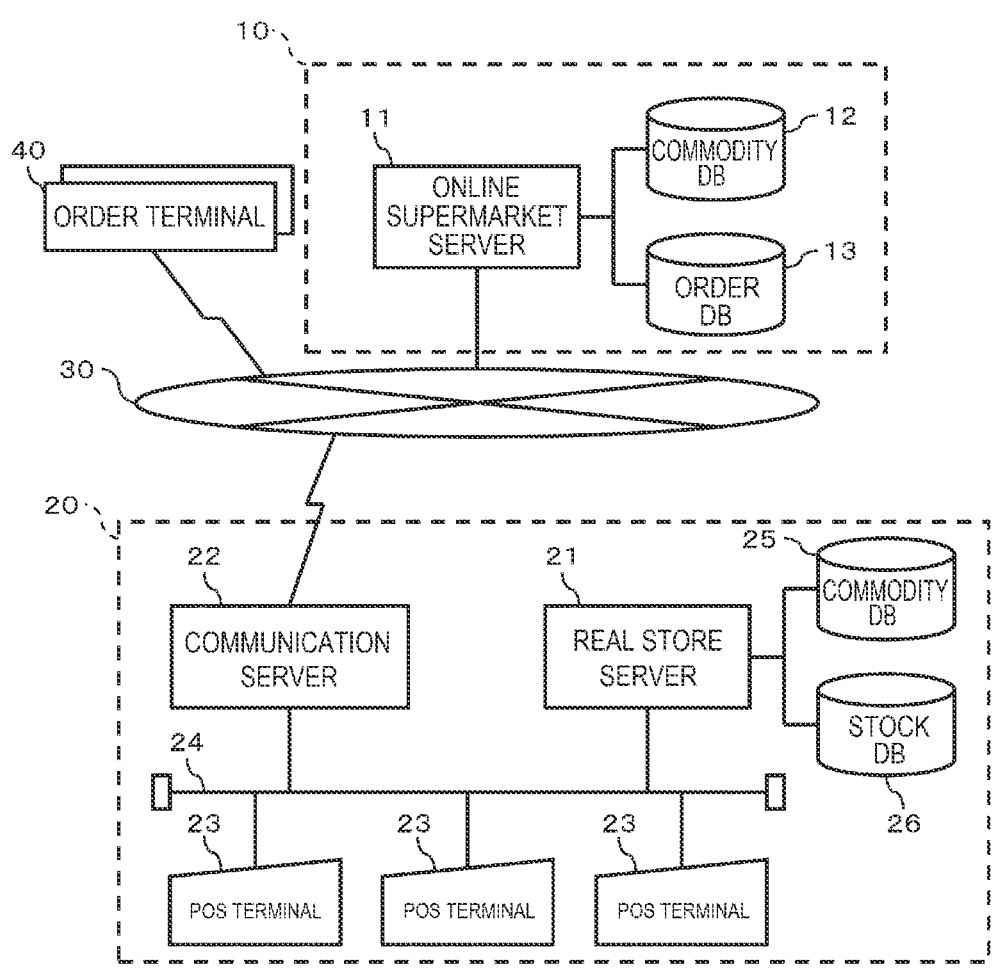
FIG. 1 is a schematic configuration diagram of a commodity sales system according to an embodiment.

FIG. 1 is a schematic configuration diagram of a commodity sales system according to one embodiment. The commodity sales system includes a virtual store system 10, a real store system 20, and a network interface 30 that connects the virtual store system 10 and the real store system 20. The network 30 contains a network interface and may be an Internet-enabled network in various embodiments to permit access to the Internet. However, the network 30 may be other networks, such as a mobile communication network. The virtual store system 10 includes an online supermarket server 11. The online supermarket server 11 is a server apparatus for realizing a sales form for receiving an order of a commodity through a virtual store, such as an online supermarket. That is, the online supermarket server 11 provides, on the network 30, a Web site for receiving an order of a commodity.

A user of the online supermarket accesses the online supermarket using an order terminal 40 accessible to the Web site. The user then uses the order terminal 40 to order a commodity sold at the online supermarket. The user can perform settlement of the ordered commodity (e.g., pay an amount owed to the online supermarket for the ordered commodity, etc.) using a credit card or the like on the online supermarket. Additionally, the user can also visit the real store and perform settlement of the ordered commodity. In one example, a user may desire to see and select commodities such as perishables and living flowers sold in the real store prior to purchasing such commodities. In such an example, the user would desire to perform settlement in the real store, even if the commodities were purchased in the online supermarket and subsequently selected at the real store by the user. The user also may select whether the user takes out the commodity ordered from the real store or receives the commodity at a designated delivery destination (e.g., the user may elect for the real store to deliver the commodity to the user). The user may perform such selections via the order terminal 40.

The order terminal 40 may be implemented with various terminals that may be located outside of a real store (but also may be located within the real store), such as an information terminal such as a personal computer, a smartphone, or a tablet terminal be applied. The order terminal 40 may also be implemented with various terminals located in a real store, such as a kiosk terminal, a shopping cart terminal, a signage terminal, a portable terminal for lending to a consumer, and the like.

The online supermarket server 11 includes a commodity database 12 and an order database 13. Collectively, the commodity database 12 and the order database 13 form an online supermarket provided by the online supermarket server 11. The commodity database 12 and the order database 13 may be provided in a storage device incorporated in the online supermarket server 11 or may be provided in a storage device connected to the online supermarket server 11 (e.g., a network storage device, etc.).

The commodity database 12 is a database storing data of commodities sold in the online supermarket and data of all commodities sold in the real store. The data of the commodities sold in the online supermarket includes, for each commodity sold, a commodity identifier (ID) of the commodity, a price of the commodity, a commodity image of the commodity, and character information of the commodity. The commodity ID is a unique code set (code) for each of the commodities offered at the online supermarket and the real store. The commodity ID may be used to identify the commodities. The commodity image and the character information are data organized in order to display (e.g., order, rank, list, etc.) the commodities on the Web site.

The order database 13 is a database storing data of commodities ordered via the network 30 (e.g., via the online supermarket). Data of unsettled commodities in the data of the ordered commodities is collected in a data file for each of users and subsequently saved in the order database 13. Not only the data of the unsettled commodities but also data of settled commodities may be collected in the data file and saved in the order database 13 by allocating settlement finish and settlement unfinish flags to the data file. As a result, the order database 13 may include a data file of all ordered commodities that are settled, including user identification associated with each settled commodity, and a data file of all ordered commodities that are unsettled, including user identification associated with each unsettled commodity.

Figure 2:
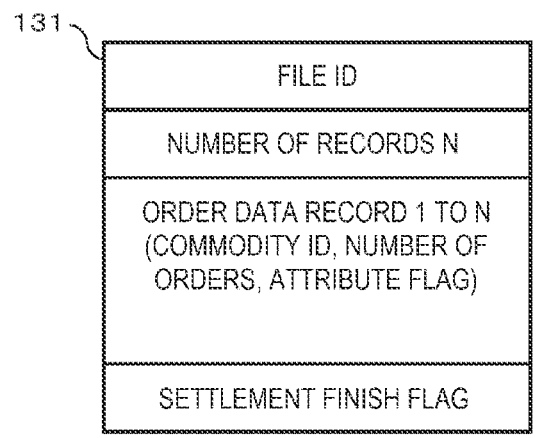
FIG. 2 is a schematic diagram illustrating a main data structure of an order file.

FIG. 2 is a schematic diagram illustrating a main data structure of an order file 131 (e.g., data file) saved in the order database 13. As illustrated in FIG. 2, the order file 131 has a structure for storing a file ID and storing the number of records N, an order data record for the number of records N, and a settlement finish flag in association with the file ID.

The file ID is a unique code set for each of files in order to individually identify the order file 131. The number of records N is the number of order data records stored in the order file 131. The order data record is a data record generated for each of commodities ordered via the network 30.

A commodity ID, the number of orders, an attribute flag (real store transaction indicator, virtual store transaction indicator), and the like are recorded in the order data record. The attribute flag is one-bit information for identifying whether the user receives a commodity in the real store and takes out the commodity (real store transaction indicator) or delivers the commodity to a designated delivery destination (virtual store transaction indicator). The attribute flag is set to "1" in the case of the takeout (that the user received the commodity at the real store) and is set to "0" in the case of the delivery (that the user did not receive the commodity at the real store).

The settlement finish flag is one-bit information for identifying whether settlement of a commodity of the order data record managed in the order file 131 ends. The settlement finish flag is "0" before the settlement end and is set to "1" if the settlement ends. The user may perform the settlement on the online supermarket or may perform the settlement in the real store.

Referring back to FIG. 1, the real store system 20 includes a real store server 21, a communication server 22, and a plurality of POS terminals 23. In the real store system 20, the real store server 21, the communication server 22, and the POS terminals 23 are connected by a local area network (LAN) 24. The LAN 24 may be a wired LAN or may be a wireless LAN.

The real store server 21 is a server apparatus for managing data related to a sales transaction of a commodity, the sales transaction performed in the real store. In order to realize such data management, the real store server 21 uses a commodity database 25 and a stock database 26. The commodity database 25 and the stock database 26 may be provided in a storage device incorporated in the real store server 21 or may be provided in a storage device connected to the outside of the real store server 21.

The commodity database 25 is a database that stores data of all commodities sold in the online supermarket and data of all commodities sold in the real store. The data of the commodities sold in the real store includes a commodity ID, a price, and a commodity name. The commodity ID is a unique code set for each of the commodities in order to identify the commodities. Incidentally, if the same commodities are sold in the real store and the online supermarket, commodity IDs set for the respective commodities may coincide.

The stock database 26 is a database that stores, in association with commodity IDs of the commodities sold in the real store and the online supermarket, a quantity of stock in the real store of the commodities.

The commodity ID functions as a first code set for identifying a commodity. On the other hand, the file ID explained with reference to FIG. 2 functions as a second code set for identifying a group of commodities ordered via the network 30. In this embodiment, the group does not always indicate a plurality of commodities. Even if only one commodity is ordered via the network 30, in this embodiment, the commodity is defined as the group of commodities ordered via the network 30 and is identified by the second code set.

Referring back to FIG. 1, the communication server 22 is a server computer that supports communication processing between the real store server 21 or the POS terminals 23 connected to the LAN 24 and the online supermarket server 11 connected to the network 30. The POS terminals 23 can call data of the order file 131 from the online supermarket server 11 through application programming interfaces (APIs) in communication with the communication server 22.

The POS terminal 23 is a computer terminal having a function of registering sales data of a commodity purchased by a purchaser (e.g., a customer, etc.) and a function of settling a price of the commodity purchased by the purchaser. The POS terminal 23 is a facing-type model with which a store clerk of the real store performs processing from registration to settlement of a commodity that the purchaser purchases. The POS terminal 23 may be a self-type model with which the purchaser himself or herself performs processing from registration to settlement of a commodity that the purchaser purchases. The POS terminal 23 may be a semi-self-type model with which the store clerk performs registration of a commodity that the purchaser purchases and the purchaser himself or herself performs settlement of the commodity. The facing-type model and the self-type model or the semi-self-type model may be mixed in one real store.

Figure 3:
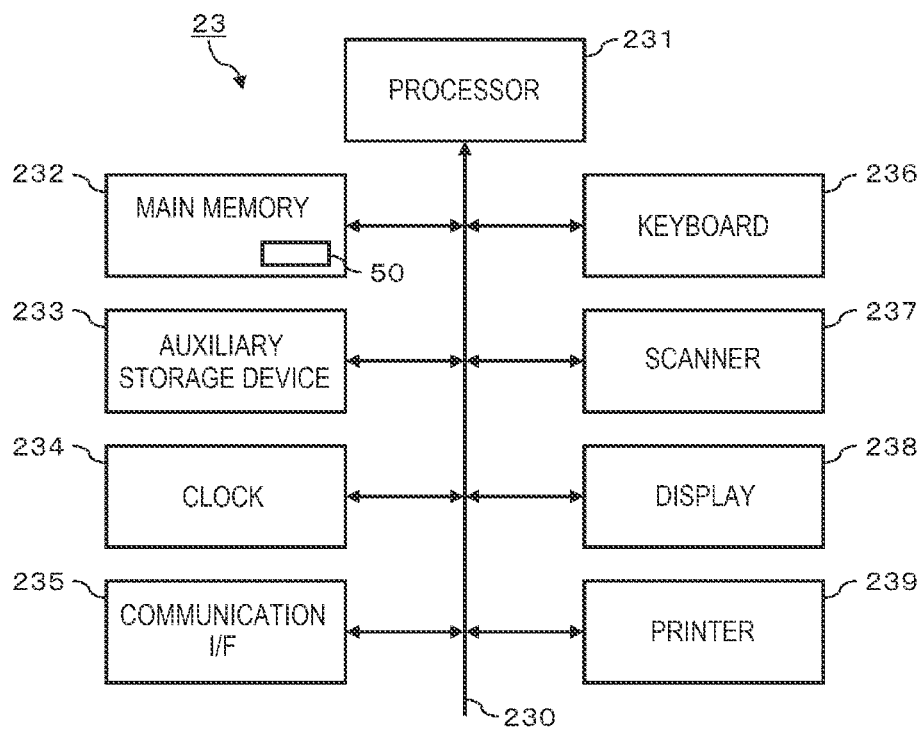
FIG. 3 is a block diagram illustrating a main part circuit configuration of a point of sale (POS) terminal.

FIG. 3 is a block diagram illustrating a main part circuit configuration of the POS terminal 23. The POS terminal 23 includes a processor 231, a main memory 232, an auxiliary storage device 233, a clock 234, a communication interface 235, a keyboard 236, a reader or scanner 237, a display 238, a printer 239, and a system transmission line 230. The system transmission line 230 includes an address bus, a data bus, and a control signal line. The processor 231, the main memory 232, the auxiliary storage device 233, the clock 234, the communication interface 235, the keyboard 236, the scanner 237, the display 238, and the printer 239 are connected to the system transmission line 230. The processor 231, the main memory 232, and the auxiliary storage device 233 are connected to the system transmission line 230, whereby a computer of the POS terminal 23 is configured.

The processor 231 is equivalent to a central part of the computer. The processor 231 controls the sections (e.g., the main memory 232, the auxiliary storage device 233, the clock 234, the communication interface 235, the keyboard 236, the scanner 237, the display 238, the printer 239, the system transmission line 230, etc.) in order to realize various functions of the POS terminal 23 according to an operating system or application programs. The processor 231 is, for example, a central processing unit (CPU).

The main memory 232 is equivalent to a main storage part of the computer. The main memory 232 includes a nonvolatile memory region and a volatile memory region. The main memory 232 stores the operating system or the application programs in the nonvolatile memory region. The main memory 232 sometimes stores, in the nonvolatile or volatile memory region, data necessary for the processor 231 in executing processing for controlling the sections. The main memory 232 uses the volatile memory region as a work area in which data is rewritten as appropriate by the processor 231. The nonvolatile memory region is, for example, a read only memory (ROM). The volatile memory region is, for example, a random access memory (RAM).

The auxiliary storage device 233 is equivalent to an auxiliary storage part of the computer. For example, the auxiliary storage device 233 can be an electric erasable programmable read-only memory (EEPROM), a hard disk drive (HDD), a solid state drive (SSD), or the like. The auxiliary storage device 233 saves data used by the processor 231 in performing various kinds of processing, data created by the processing in the processor 231, and the like. The auxiliary storage device 233 may also store application programs.

The application programs include a control program as described herein. The control program may be stored in the main memory 232 or the auxiliary storage device 233 and executed by the processor 231. A method of installing the control program in the main memory 232 or the auxiliary storage device 233 is not particularly limited to the methods described herein. The control program can be installed in the main memory 232 or the auxiliary storage device 233 by being recorded in a removable recording medium or by being distributed through communication via a network. A form of the recording medium may be any form if the recording medium can store programs and can be read by an apparatus like a CD-ROM, a memory card, or the like.

The clock 234 clocks a date and time and functions as a time information source of the POS terminal 23. The processor 231 processes, as the present date and time, the date and the time clocked by the clock 234.

The communication interface 235 performs data communication between the communication interface 235 and the real store server 21 or the communication server 22 connected via the LAN 24.

The keyboard 236 functions as an input device. Various keys such as a ten key, a subtotal key, an accounting key, a cancel key, and a clear key are disposed on the keyboard 236.

The scanner 237 functions as a reading device for a code symbol such as a barcode or a two-dimensional data code. The scanner 237 may be a type for reading the code symbol with scanning of a laser beam or may be a type for reading the code symbol from an image captured by an imaging device.

In this embodiment, it is assumed that a barcode BC1 (see FIG. 4) corresponding to a commodity ID is attached to a commodity sold in the real store. It is assumed that a barcode BC2 (see FIG. 4) corresponding to a file ID of the order file 131 is displayed on a display device of the order terminal 40.

FIG. 4 is a schematic diagram illustrating an example of the barcode BC1 corresponding to the commodity ID and the barcode BC2 corresponding to the file ID. As illustrated in FIG. 4, the barcode BC1 has a code system in which leading two digits are set as a first flag "FF" and a commodity ID is added after the first flag "FF." A value of the first flag "FF" is optional. However, "99" is excluded. The barcode BC2 has a code system in which leading two digits are fixed as a second flag "99" not used in the barcode BC1 and a file ID is added after the second flag "99." The second flag is not limited to "99" and only has to be a value not used in the first flag "FF."

Referring back to FIG. 3, the display 238 functions as a display device. A registration screen 60 (60A, 60B, 60C, and 60D (see FIGS. 8 to 11)) explained herein and the like are displayed on the display 238. The display 238 may be a touch panel-type display.

The printer 239 functions as a printing device for a receipt. The printer 239 prints detail data and the like of one transaction (e.g., on roll-like receipt paper, etc.). In some embodiments, the receipt paper, on which the detail data is printed, is cut for each settlement of one transaction and issued as a receipt. The printer 239 can be, for example, a thermal printer, a dot impact printer, or the like.

Although not illustrated, the POS terminal 23 may include, besides the above, an automatic change machine, a drawer, a card reader for credit cards, and a reader writer for electronic money, as appropriate.

The POS terminal 23 having such a configuration uses a part of a volatile region of the main memory 232 as a transaction memory 50. The transaction memory 50 is a region for registering commodity sales data related to one transaction.

FIG. 5 is a schematic diagram illustrating an area configuration of the transaction memory 50. As illustrated in FIG. 5, the transaction memory 50 includes a detail area 51 in which a commodity code, a commodity name, a price, the number of sold items, a sales amount, and a takeout flag (network identifier) are sequentially described and a total area 52 in which a total number of items and a total amount are described. The takeout flag is one-bit data for identifying whether a commodity identified by a commodity code corresponding thereto is a takeout target or a delivery target. In this embodiment, the takeout flag in the case of the takeout target is set to "1" (e.g., when the user picks up the commodity from the real store) and the takeout flag in the case of the delivery target is set to "0" (e.g., when the user elects to have the commodity delivered to the user).

Figure 6:
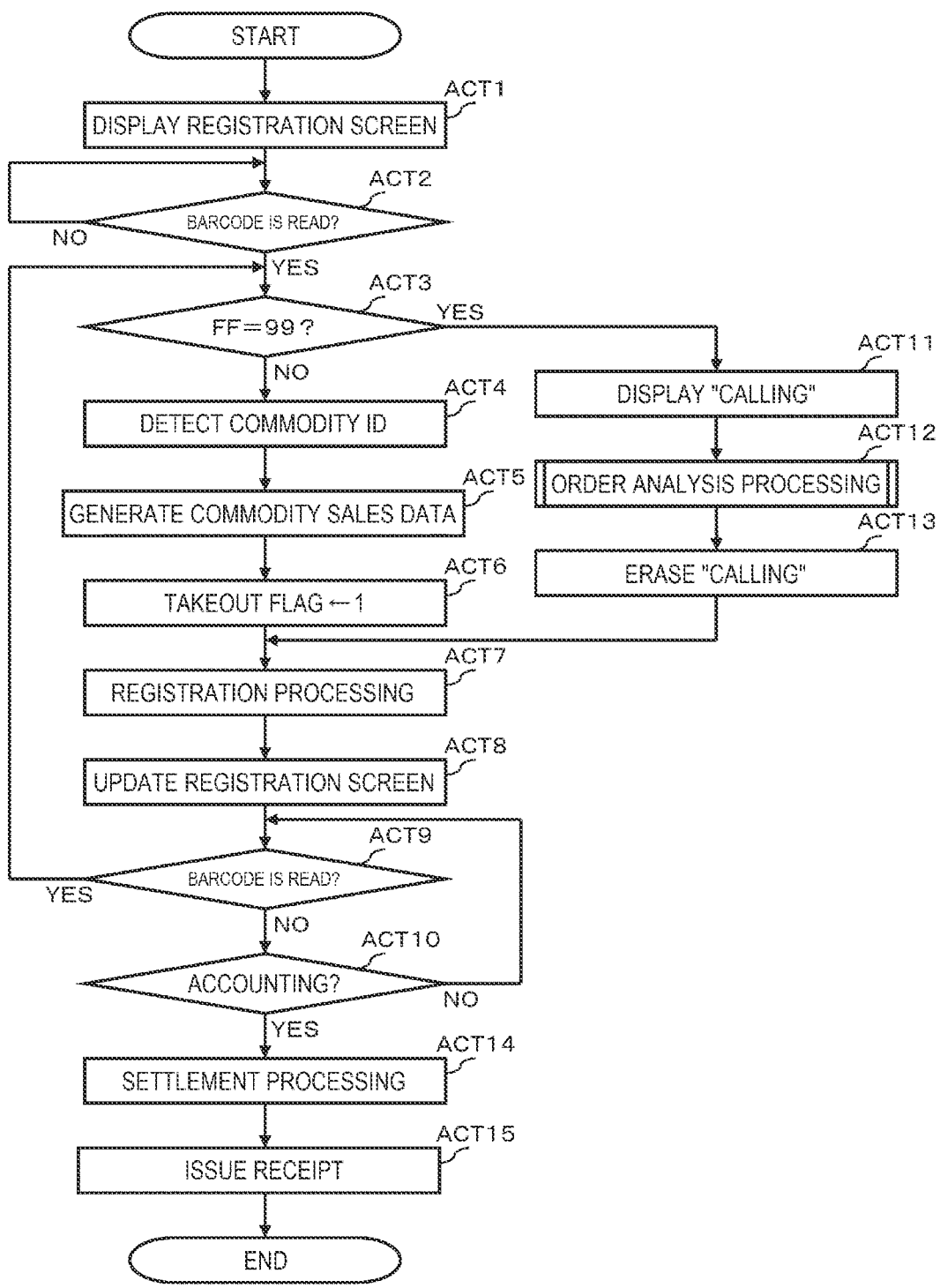
FIG. 6 is a flowchart illustrating a procedure of main information processing executed by a processor according to a control program.
Figure 7:
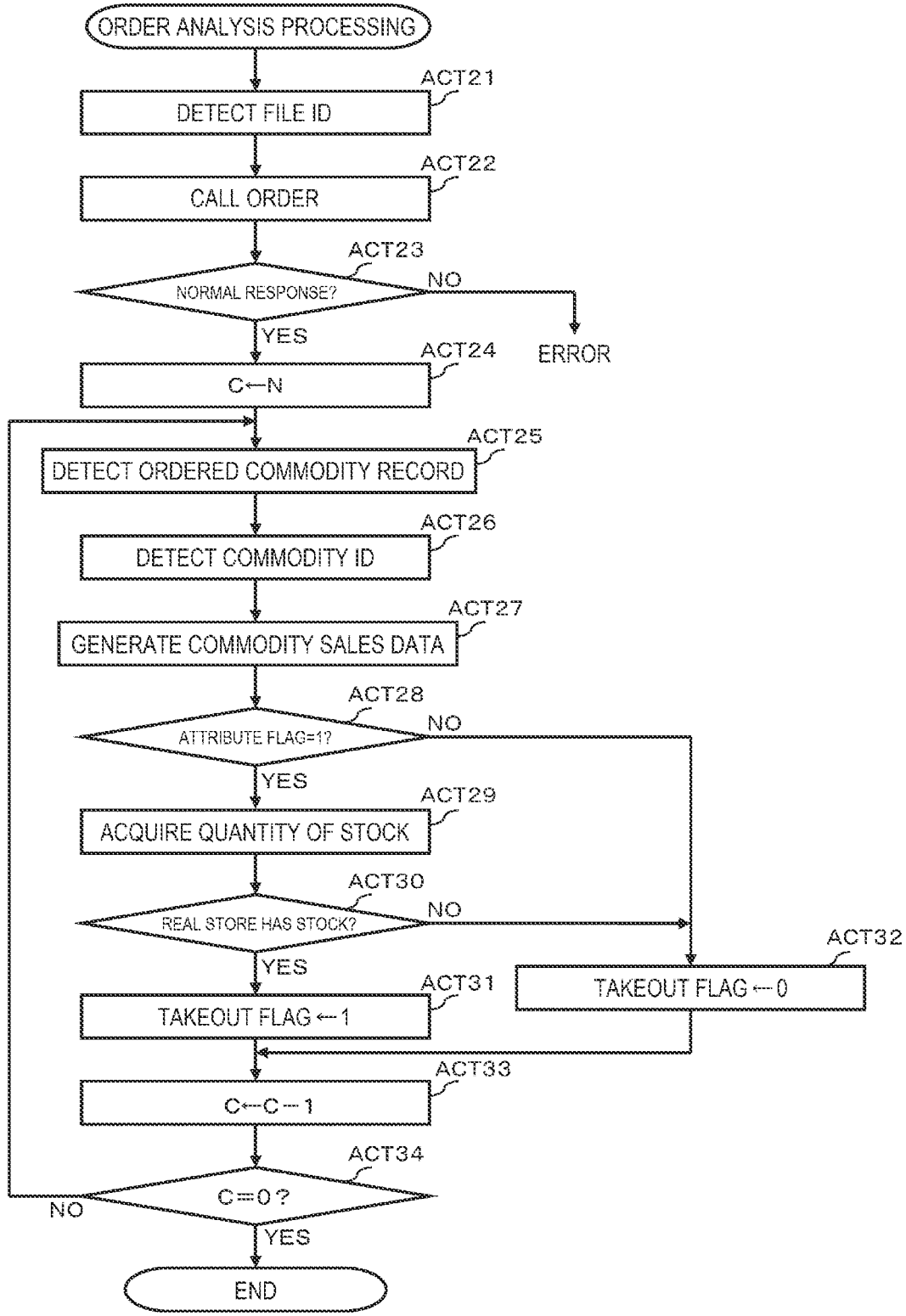
FIG. 7 is a flowchart specifically illustrating a procedure of order analysis processing illustrated in FIG. 6.

FIGS. 6 and 7 are flowcharts illustrating a procedure of main information processing executed by the processor 231 according to the control program. FIGS. 8 to 11 are diagrams illustrating a transition example of registration screens displayed on the display 238 by the information processing. In operations explained below with reference to the drawings, a user of the online supermarket, who orders a commodity sold in the online supermarket via the network 30, acts as a purchaser and purchases a commodity sold in the real store, and collectively settles the commodities in the real store. The operation explained below is an example and other similar operations are possible. The procedure is not particularly limited and similar procedures which obtain the same result may be implemented in other embodiments.

First, data related to a commodity ordered in the online supermarket by the user of the online supermarket is recorded in the order file 131 as an order data record and saved in the order database 13. If the user decides, by operating the order terminal 40, to perform, in the real store, settlement of the commodity ordered in the online supermarket, data of the barcode BC2 including the file ID of the order file 131 is transmitted from the online supermarket server 11 to the order terminal 40 via the network 30. Consequently, the order terminal 40 is capable of displaying an image of the barcode BC2 on the display device. Alternatively, a printer connected to the order terminal 40 is capable of printing the image of the barcode BC2.

The user carries the order terminal 40 or brings paper on which the image of the barcode BC2 is printed to the real store. If the user purchases a commodity in the real store, the user brings the commodity to an accounting place (e.g., a POS, a register, etc.). The user presents, to a store clerk in the accounting place, together with the commodity that the user purchases in the real store, the barcode BC2 displayed on the display device of the order terminal 40 or the barcode BC2 printed on recording paper.

The store clerk operates the scanner 237 of the POS terminal 23 and causes the scanner 237 to read the barcode BC2 presented by the user. The store clerk causes the scanner 237 to also read the barcode BC1 attached to the commodity that the user purchases in the real store. Thereafter, the store clerk inputs the accounting key disposed on the keyboard 236. If the POS terminal 23 is a self-type model, instead of the store clerk, the user himself or herself performs the same operation as the operation explained above. If starting processing conforming to the control program, in ACT1, the processor 231 of the POS terminal 23 causes the display 238 to display the registration screen 60.

FIG. 8 is a display example of the registration screen 60 in an initial state. In the following explanation, the registration screen 60 in the initial state is represented as registration screen 60A.

As illustrated in FIG. 8, a detail area 61 in which a list of a commodity name, a price, the number of items, and an amount of a commodity to be purchased and a total area 62 in which a total number of items and a total amount are displayed are formed on the registration screen 60A. The present date and time clocked by the clock 234 is also displayed on a part of the screen. In some embodiments, no data is displayed in the detail area 61 and the total area 62. Data "0" may be displayed in the total area 62. If the registration screen 60A is displayed, data of the transaction memory 50 is cleared.

Referring back to FIG. 6, in ACT2, the processor 231, which displays the registration screen 60A, waits for a barcode to be read. If detecting that a barcode is read via the scanner 237, the processor 231 determines YES in ACT2 and proceeds to ACT3. In ACT3, the processor 231 confirms whether leading two digits obtained by analyzing the barcode are the second flag "99."

If the leading two digits of the barcode are other than the second flag "99," that is, if the barcode BC1 is read, the processor 231 determines NO in ACT3 and proceeds to ACT4. In ACT4, the processor 231 detects a commodity ID from the barcode BC1. In ACT5, the processor 231 generates commodity sales data based on the commodity ID.

Specifically, the processor 231 controls the communication interface 235 to output an inquiry command for commodity data to the real store server 21. According to the control, the communication interface 235 transmits the inquiry command for commodity data to the real store server 21. The inquiry command includes the commodity ID obtained in the processing of ACT4. The real store server 21 receives the inquiry command through the LAN 24. The real store server 21 searches through the commodity database 25. The real store server 21 detects (determines) commodity data such as a price and a commodity name from a data record including the commodity ID included in the inquiry command. The real store server 21 includes the commodity data such as the commodity ID, the price, and the commodity name in a response command and transmits the commodity data to the POS terminal 23 at the inquiry command transmission source. The POS terminal 23 at the inquiry command transmission source receives the response command through the LAN 24.

The processor 231, which controls the output of the inquiry command in this way, generates commodity sales data including the commodity ID, the commodity name, the price, the number of sold items, and a sales amount. Incidentally, if a numeric input is performed by operation of the ten key, the number of sold items is a numerical value of the numeric input. If a numeric input is not performed, the number of sold items is "1." The sales amount is an amount obtained by multiplying the price by the number of sold items. The commodity sales data may include a price-off (e.g., sale, discount, etc.) amount and the like besides the above.

If finishing generating the commodity sales data, in ACT6, the processor 231 sets a takeout flag (network identifier) added to the commodity sales data to "1." In ACT7, the processor 231 performs registration processing. That is, the processor 231 describes the commodity sales data and the takeout flag added to the commodity sales data in one row in the detail area 51 of the transaction memory 50. The processor 231 calculates a total of the numbers of sold items and a total of sales amounts and rewrites data of the total area 52.

Thereafter, in ACT8, the processor 231 updates the registration screen 60 based on the data of the transaction memory 50. That is, the processor 231 controls the display 238 such that the commodity name, the price, the number of sold items, the sales amount, and the takeout flag stored in the detail area 51 of the transaction memory 50 are displayed in the detail area 61 of the registration screen 60 and the total number of items and the total amount in the total area 52 are displayed in the total area 62.

FIG. 9 is a display example of the registration screen 60 after the barcode BC1 of a commodity AAAAA having a price of 1,500 yen sold in the real store is read by the scanner 237 in a situation in which the registration screen 60A illustrated in FIG. 8 is displayed. The number of sold items is "1." In the following explanation, the registration screen 60 at this point in time is represented as the registration screen 60B.

As illustrated in FIG. 9, a commodity name, a price, the number of sold items, and a sales amount of the commodity AAAAA are displayed in a detail area of the registration screen 60B. Since the takeout flag is set to "1," the takeout flag is replaced with a mark for takeout 63T and the mark for takeout 63T is displayed. The mark for takeout 63T is displayed near the commodity name. In FIG. 9, the mark for takeout 63T is displayed on the left side of the commodity name on the screen. The mark for takeout 63T is a mark indicating that the takeout flag is "1," that is, a commodity is a takeout target commodity. A total number of items and a total amount at the present point in time are displayed in the total area 62. Referring back to FIG. 6, in ACT9, the processor 231, which causes the display 238 to display the registration screen 60B, detects (determines) whether the next barcode is read. If the next barcode is not read, the processor 231 determines NO in ACT9 and proceeds to ACT10. In ACT10, the processor 231 detects whether the accounting key is input. If the accounting key is not input, the processor 231 determines NO in ACT10 and returns to ACT9. According to the processing of ACT9 and ACT10, the processor 231 waits for a barcode to be read or the accounting key to be input.

If detecting in the waiting state in ACT9 and ACT10 that a barcode is read via the scanner 237, the processor 231 determines YES in ACT9 and returns to ACT3 as explained above. That is, in ACT3, the processor 231 confirms whether leading two digits obtained by analyzing the barcode are the second flag "99." If the leading two digits of the barcode are other than the second flag "99," that is, the barcode BC1 is read, the processor 231 executes the processing of ACT4 to ACT8 as explained above.

On the other hand, if the leading two digits of the barcode are the second flag "99," that is, the barcode BC2 is read, the processor 231 determines YES in ACT3 and proceeds to ACT11. In ACT11, the processor 231 superimposes and displays an image 64 of "calling" (see FIG. 10) on the registration screen 60 displayed on the display 238.

FIG. 10 is a display example of the registration screen 60 at the time when the barcode BC2 of the second flag "99" is read in a state in which the registration screen 60B illustrated in FIG. 9 is displayed. In the following explanation, the registration screen 60 at this point in time is represented as the registration screen 60C.

As illustrated in FIG. 10, the image 64 of "calling" is displayed in the detail area 61 on the registration screen 60C.

The image 64 notifies a store clerk or a user of the online supermarket, who is a purchaser, that data of the order file 131 identified by the file ID included in the barcode BC2 is being called from the online supermarket server 11. After displaying the image 64 of "calling," in ACT12, the processor 231 performs order analysis processing. FIG. 7 is a flowchart illustrating a main part procedure of the order analysis processing. If starting the order analysis processing, in ACT21, the processor 231 detects the file ID from the barcode BC2. In ACT22, the processor 231 controls the communication interface 235 to output a calling command for the order file 131 to the online supermarket server 11. According to the control, the communication interface 235 transmits the calling command for the order file 131 to the online supermarket server 11. The calling command includes the file ID obtained in the processing of ACT21. The online supermarket server 11 receives the calling command through the LAN 24, the communication server 22, and the network 30.

The online supermarket server 11 searches through the order database 13. The online supermarket server 11 detects the order file 131 including the file ID included in the calling command. The online supermarket server 11 includes the data of the order file 131 in a normal response command and transmits the data to the POS terminal 23 at the calling command transmission source. The POS terminal 23 at the calling command transmission source receives the normal response command through the network 30, the communication server 22, and the LAN 24.

If the order file 131 including the file ID is absent in the order database 13 or if the order file 131 is present but the settlement finish flag is already in a settlement finish state, the online supermarket server 11 transmits an error response command. The POS terminal 23 at the calling command transmission source also receives the error response command through the network 30, the communication server 22, and the LAN 24.

In ACT23, the processor 231, which controls the output of the calling command, determines whether the response command from the online supermarket server 11 is the normal response command or the error response command. If the response command is the error response command, the processor 231 determines NO in ACT23 and determines that the reading of the barcode BC2 is an error.

Incidentally, if the reading of the barcode BC2 is an error, the image 64 of "calling" is erased and an error message is displayed instead. Therefore, the store clerk performs confirmation operation. For example, the store clerk inputs the cancel key of the keyboard. In response to such confirmation operation, the processor 231 returns to the waiting state in ACT9 and ACT10.

If the response command from the online supermarket server 11 is the normal response command, the processor 231 determines YES in ACT23 and proceeds to ACT24. In ACT24, the processor 231 detects the number of records N from the order file 131 included in the normal response command and sets the number of records N in a subtraction counter C as an initial value. The subtraction counter C is provided in the volatile region of the main memory 232.

In ACT25, the processor 231 detects an order data record at the top from the order file 131. Further, in ACT26, the processor 231 detects a commodity ID of an ordered commodity from the order data record. In ACT27, the processor 231 generates commodity sales data based on the commodity ID. The processing of ACT27 is the same as the processing of ACT5 explained above. Therefore, explanation of the processing of ACT27 is omitted.

If finishing generating the commodity sales data, in ACT28, the processor 231 confirms whether an attribute flag of the order data record acquired in the processing of ACT25 is "1." If the attribute flag is "1," that is, takeout is designated for the ordered commodity, in ACT29, the processor 231 acquires a quantity of stock of the ordered commodity.

Specifically, the processor 231 controls the communication interface 235 to output an inquiry command for stock data to the real store server 21. According to the control, the communication interface 235 transmits the inquiry command for stock data to the real store server 21. The inquiry command includes the commodity ID obtained in the processing of ACT26. The real store server 21 receives the inquiry command through the LAN 24. The real store server 21 searches through the stock database 26. The real store server 21 detects a quantity of stock from a data record including the commodity ID included in the inquiry command. The rear store server 21 includes stock data such as the quantity of stock in the response command and transmits the stock data to the POS terminal 23 at the inquiry command transmission source. The POS terminal 23 at the inquiry command transmission source receives the response command through the LAN 24. The processor 231, which controls the output of the inquiry command in this way, acquires stock data including the quantity of stock.

In ACT30, the processor 231, which acquires the stock data, confirms whether the quantity of stock included in the stock data is "0." If the quantity of stock is not "0," that is, the real store has stock, the processor 231 determines YES in ACT30 and proceeds to ACT31. In ACT31, the processor 231 sets the takeout flag added to the commodity sales data generated in the processing of ACT27 to "1."

On the other hand, if the attribute flag is "0" in ACT28 or the quantity of stock is "0" in ACT30, the processor 231 determines NO and proceeds to ACT32. In ACT32, the processor 231 sets the takeout flag added to the commodity sales data generated in the processing of ACT27 to "0."

As explained above, the takeout flag is "1" in the case of the takeout target and is "0" in the case of the delivery target. Therefore, according to the execution of the processing of ACT28 to ACT32 by the processor 231, if there is stock about the commodity for which takeout is designated during the order, the commodity is set as the takeout target. However, if there is no stock, the commodity is set as the delivery target.

If setting the takeout flag to "1" or "0" in ACT31 or ACT32, the processor 231 proceeds to ACT33. In ACT33, The processor 231 subtracts the subtraction counter C by "1." In ACT34, the processor 231 confirms whether the subtraction counter C is "0." If the subtraction counter C is not "0," that is, is equal to or larger than "1," the processor 231 determines NO in ACT34 and returns to ACT25. The processor 231 detects the next order data record from the order file 131 and executes the processing of ACT26 to ACT34 in the same manner as explained above.

In this way, the processor 231 repeatedly executes the processing of ACT25 to ACT34 by the number of order data record saved in the order file 131. If the subtraction counter C is "0," the processor 231 determines YES in ACT34 and ends the order analysis processing. If ending the order analysis processing, the processor 231 proceeds to ACT13 in FIG. 6. In ACT13, the processor 231 erases the image 64 of "calling." The processor 231 proceeds to ACTT. That is, the processor 231 sequentially describes, in the detail area 51 of the transaction memory 50, all commodity sales data generated in the processing of ACT27 in FIG. 7 and the takeout flag added to the commodity sales data. The processor 231 calculates a total of the numbers of sold items and a total of sales amounts and rewrites the data of the total area 52. Thereafter, in ACT8, the processor 231 updates the registration screen 60 based on the data of the transaction memory 50.

FIG. 11 is a display example of the registration screen 60 after the barcode BC2 including the file ID of the order file 131 that stores order data records of three articles of a commodity BBBBB, a commodity CCCCC, and a commodity DDDDD is read and updated in a situation in which the registration screen 60B illustrated in FIG. 9 is displayed. All the numbers of sold items of the commodities are "1." In the following explanation, the registration screen 60 at this point in time is represented as the registration screen 60D.

As illustrated in FIG. 11, commodity names, prices, the numbers of sold items, and sales amounts of a group of the commodity BBBBB, the commodity CCCCC, and the commodity DDDDD ordered via the network 30 are added and displayed in the detail area of the registration screen 60D. Concerning the commodity BBBBB and the commodity DDDDD for which "1" is set as the takeout flag, the takeout flag is replaced with the mark for takeout 63T and the mark for takeout 63T is displayed. On the other hand, concerning the commodity CCCCC for which "0" is set as the takeout flag, the takeout flag is replaced with a mark for delivery 63D and the mark for delivery 63D is displayed. The mark for delivery 63D is a mark indicating that the takeout flag is "0," that is, a commodity is a delivery target commodity. A total number of items and a total amount of the commodity AAAAA purchased in the real store and the group of the commodity BBBBB, the commodity CCCCC, and the commodity DDDDD ordered via the network 30 are displayed in the accounting area 62.

Referring back to FIG. 6, the processor 231, which updates the registration screen 60, returns to the waiting state in ACT9 and ACT10. In the waiting state, if a barcode is read via the scanner 237 again, the processor 231 returns to ACT3. If leading two digits of the barcode are other than the second flag "99," that is, if the barcode BC1 is read, the processor 231 executes the processing of ACT4 to ACT8 in the same manner as explained above. On the other hand, if the leading two digits of the barcode are the second flag "99," that is, if the barcode BC2 is read, the processor 231 executes the processing of ACT11 to ACT13, ACTT, and ACT8 in the same manner as explained above.

If detecting that the accounting key is input via the keyboard 236 in the waiting state in ACT9 and ACT10, the processor 231 determines YES in ACT10 and proceeds to ACT14. In ACT14, the processor 231 performs settlement processing based on the data stored in the transaction memory 50. As the settlement processing, there are settlement processing by cash, settlement processing by a credit card, settlement processing by electronic money, and the like. In this embodiment, the settlement processing may be anyone of these kinds of settlement processing. Alternatively, the settlement processing may be other settlement processing. The processor 231 may perform the settlement processing concurrently using a plurality of payment methods such as the cash and the credit card, the cash and the electronic money, or the credit card and the electronic money.

If ending the settlement processing, the processor 231 proceeds to ACT15. In ACT15, the processor 231 causes the printer 239 to operate and controls issuance of a receipt. Then, the processor 231 ends the information processing for one transaction.

FIG. 12 is a printing example of a receipt 70 issued from the printer 239 according to the input of the accounting key in a situation in which the registration screen 60D illustrated in FIG. 11 is displayed. As illustrated in FIG. 12, commodity names, the numbers of items, sales amounts, a total number of sales items, a total amount, and the like of settled commodities are printed on the receipt 70 based on the data stored in the transaction memory 50. A mark for takeout 71T is printed for a takeout target commodity and a mark for delivery 71D is printed for a delivery target commodity. Therefore, a purchaser, that is, a user of the online supermarket who receives the receipt 70 can easily learn that the commodity attached with the mark for takeout 71T is the takeout target commodity and the commodity attached with the mark for delivery 71D is the delivery target commodity.

As it is evident from the above explanation, the POS terminal 23 includes the scanner 237 as input means for the barcode BC1 corresponding to the commodity ID and the barcode BC2 corresponding to the file ID of the order file 131. The computer configured mainly by the processor 231 of the POS terminal 23 includes a first registering section, an acquiring section, a second registering section, and a settling section explained below. That is, the computer executes the processing of ACT3 to ACT7 in FIG. 6 to thereby configure the first registering section that registers sales data of a commodity identified by the barcode BC1. The computer executes the processing of ACT3 in FIG. 6 and ACT21 to ACT24 in FIG. 7 to thereby configure the acquiring section that acquires data of a commodity group identified by the barcode BC2 from the online supermarket server 11, which is a data saving destination of an ordered commodity. The computer executes the processing of ACT25 to ACT34 in FIG. 7 and ACT7 in FIG. 6 to thereby configure the second registering section that registers sales data of a commodity included in the commodity group identified by the barcode BC2. The computer executes the processing of ACT14 in FIG. 6 to thereby configure the settling section that executes settlement processing based on the sales data of the commodity registered by the first registering section and the commodity registered by the second registering section.

With such a configuration, according to this embodiment, it is possible to provide the POS terminal 23 that can settle, as one transaction, a commodity ordered via the network and a commodity purchased in the real store.

The computer executes the processing of ACT3 in FIG. 6 to thereby configure an identifying section. That is, if a flag of a barcode read by a scanner is a first flag, the computer identifies that an identification code is a commodity ID, which is a first code and, if the flag of the barcode is a second flag, the computer identifies that an identification code is a file ID, which is a second code. Since the computer includes such an identifying section, an operator of the POS terminal 23, that is, a store clerk or a user of the online supermarket can perform, by operating the scanner 237, which is the input section, in the same manner, registration processing of a commodity ordered via the network and a commodity purchased in the real store. This makes it possible to settle, as one transaction, the commodity ordered via the network and the commodity purchased in the real store. Accordingly, the operation of the POS terminal 23 is not complicated. There is no concern about an increase in a burden on the operator.

The input section is a receiver which is not limited to the scanner or reader 237 that reads a code. For example, the code may be input by operation of a keyboard or a touch panel. Alternatively, the code may be input by voice input.

The computer executes the processing of ACT8 in FIG. 6 in cooperation with the display 238 to thereby configure a display section (a display screen or display interface). That is, the computer displays, on one registration screen 60, detail information of the commodity, the sales data of which is registered by the first registering section, and detail information of the commodity, the sales data of which is registered by the second registering section. Since the computer includes the displaying section, the operator of the POS terminal 23 can confirm, from display information of the one screen, details of the commodity ordered via the network and details of the commodity purchased in the real store. Therefore, there is no concern about an increase in a burden on the operator required for the confirmation of the details.

Moreover, the display section displays, on the registration screen 60, the commodity ordered via the network while distinguishing whether the commodity is a takeout target commodity or a delivery target commodity. Therefore, there is an effect that the operator who confirms the registration screen 60 can easily identify whether the commodity ordered via the network is the takeout target commodity or the delivery target commodity.

The display section displays, as the takeout target commodity, the commodity purchased in the real store. It is evident that the user, who is the purchaser, takes out the commodity purchased in the real store. Therefore, the operator can distinguish the takeout target commodity and the delivery target commodity without being aware of whether the commodities are commodities ordered via the network or commodities purchased in the real store.

Even if a commodity is ordered as the takeout target commodity via the network, the display section displays the commodity as the delivery target commodity if the commodity is out of stock in the real store. Even if the commodity is ordered as the takeout target commodity, the commodity cannot be taken out if the commodity is out of stock. Therefore, a deficiency in which the commodity that cannot be taken out is displayed as the takeout target commodity cannot occur. Therefore, the operator can distinguish the takeout target commodity and the delivery target commodity at ease.

The embodiment of the commodity sales data processing apparatus that can settle, as one transaction, a commodity ordered via the network and a commodity purchased in the real store is explained above. However, such an embodiment is not limited to such an operation.

For example, in the embodiment, the example is explained in which the operator of the POS terminal 23 reads the barcode BC1 first and hereafter reads the barcode BC2. However, the order of reading of the barcode BC1 and the barcode BC2 is not particularly limited. It is also possible that the barcode BC2 is read first and thereafter the barcode BC1 is read. Alternatively, it is also possible that the barcode BC1 is read, the barcode BC2 is subsequently read, and the barcode BC1 is read again.

The first code and the second code are not limited to the barcodes. For example, the first code and the second code may be two-dimensional data codes. Alternatively, the first code may be the barcode and the second code may be the two-dimensional code. If a wireless tag (e.g., radio frequency identification tag, etc.) storing a commodity ID of a commodity sold in the real store is attached to the commodity, means for reading the first code may be a wireless tag reader.

In the embodiment, the functions of the commodity sales data processing apparatus are realized by the POS terminal of the real store that introduces the service for enabling a user to receive, in the real store, a commodity order in the online supermarket. As another embodiment, the functions of the commodity sales data processing apparatus may be realized by a POS terminal of a real store that introduces a service for enabling a user to receive, in the real store, a commodity order in an online shop or an electronic commerce (EC) site other than the online supermarket.

It is also possible to configure a commodity sales system not including the real store server 21. In this case, the commodity database 25 is included in each POS terminal 23. The stock database 26 is included in the online supermarket server 11. The commodity database 25 stores data of commodities sold in the online supermarket and all commodities sold in the real store. In the embodiment in which the real store server 21 is not provided, exchange of an inquiry command and the like for commodity data is performed on the inside of the POS terminal 23.

The several embodiments are explained above. However, the embodiments are presented as examples and are not intended to limit the scope of the present disclosure. These new embodiments can be implemented in other various forms. Various omissions, substitutions, and changes can be made without departing from the spirit of the present disclosure. These embodiments and modifications of the embodiments are included in the scope and the gist of the present disclosure and included in the claims and the scope of equivalents of the claims.

What is claimed is:

1. A commodity processing apparatus comprising:
    a receiver configured to obtain an input code;
    a computer configured to:
        determine whether the input code is a first code, the first code associated with a scanned commodity ordered at a store;
        determine whether the input code is a second code, the second code associated with a network commodity group ordered via a network;
        acquire, after determining that the input code is the second code, network commodity group data from a destination associated with network ordered commodities, the network commodity group data associated with the network commodity group; and
        identify, after the acquisition of the network commodity group data, a network commodity in the network commodity group; and
    a display configured to display a first registration screen comprising at least one of:
        scanned detail information associated with the scanned commodity; or
        network detail information associated with the network commodity.

2. The commodity processing apparatus of claim 1, wherein:
    the network commodity group comprises a plurality of network commodities;
    the network commodity group data comprises a network identifier for each of the plurality of network commodities, each network identifier being a takeout identifier or a delivery identifier;
    the takeout identifier is associated with removal from the store; and
    the delivery identifier is associated with delivery.

3. The commodity processing apparatus of claim 2, wherein the display is further configured to display a second registration screen, the second registration screen comprising a list of the network identifier for each of the plurality of network commodities.

4. The commodity processing apparatus of claim 2, wherein the computer is further configured to identify, after determining that the input code is the first code, scanned sales data from the input code, the scanned sales data associated with the scanned commodity and comprising a scanned identifier, the scanned identifier being the takeout identifier or the delivery identifier.

5. The commodity processing apparatus of claim 4, wherein the display is further configured to display a second registration screen, the second registration screen comprising the scanned identifier.

6. A control method for a commodity processing apparatus including a receiver configured to obtain an input code, the control method comprising:
    determining whether the input code is a first code, the first code associated with a scanned commodity ordered at a store;
    determining whether the input code is a second code, the second code associated with a network commodity group ordered via a network;
    acquiring, after determining that the input code is the second code, network commodity group data from a destination associated with network ordered commodities, the network commodity group data associated with the network commodity group;
    identifying, after acquiring the network commodity group data, a network commodity in the network commodity group; and
    displaying a first registration screen comprising at least one of:
        scanned detail information associated with the scanned commodity; or
        network detail information associated with the network commodity.

7. The control method of claim 6, wherein:
    the network commodity group comprises a plurality of network commodities;
    the network commodity group data comprises a network identifier for each of the plurality of network commodities, each network identifier being a takeout identifier or a delivery identifier;
    the takeout identifier is associated with removal from the store; and
    the delivery identifier is associated with a delivery.

8. The control method of claim 7, further comprising displaying a second registration screen, the second registration screen comprising a list including the network identifier for each of the plurality of network commodities.

9. The control method of claim 7, further comprising identifying, after determining that the input code is the first code, scanned sales data from the input code, the scanned sales data associated with the scanned commodity and comprising a scanned identifier, the scanned identifier being the takeout identifier or the delivery identifier.

10. The control method of claim 9, further comprising displaying a second registration screen, the second registration screen comprising the scanned identifier.

11. The control method of claim 6, further comprising:
    identifying an input flag in the input code;
    comparing the input flag to a first flag and a second flag, the second flag different from the first flag;
    determining that the input code is the first code in response to the input flag being the first flag; and determining that the input code is the second code in response to the input flag being the second flag.

12. The control method of claim 11, further comprising:
identifying a scanned identification code from the input code after determining that the input code is the first code, the scanned identification code for identifying the scanned commodity; and
identifying a network identification code from the input code after determining that the input code is the second code, the network identification code for identifying the network commodity group data.

13. A non-transitory computer-readable medium including a control program for implementation on a computer of a commodity processing apparatus, the apparatus including a receiver configured to obtain an input code, the control program comprising:
determining whether the input code is a target code, the target code being associated with a network commodity group ordered via a network;
acquiring, after determining that the input code is the target code, network commodity group data from a destination associated with network ordered commodities, the network commodity group data associated with the network commodity group;
identifying, after acquiring the network commodity group data, a network commodity in the network commodity group; and
displaying a first registration screen comprising network detail information associated with the network commodity.

14. The computer-readable medium of claim 13, wherein:
the network commodity group comprises a plurality of network commodities;
the network commodity group data comprises a network identifier for each of the plurality of network commodities, each network identifier being a takeout identifier or a delivery identifier;
the takeout identifier is associated with removal from a store; and
the delivery identifier is associated with a delivery.

15. The computer-readable medium of claim 14, further comprising displaying a second registration screen, the second registration screen comprising a list including the network identifier for each of the plurality of network commodities.

16. The computer-readable medium of claim 14, further comprising identifying, after determining that the input code is not the target code, scanned sales data from the input code, the scanned sales data associated with a scanned commodity and comprising a scanned identifier, the scanned identifier being the takeout identifier or the delivery identifier.

17. The computer-readable medium of claim 16, further comprising displaying a second registration screen, the second registration screen comprising the scanned identifier.

18. The computer-readable medium of claim 13, further comprising:
identifying an input flag in the input code;
comparing the input flag to a first flag and a second flag, the second flag different from the first flag; and
determining that the input code is not the target code in response to the input flag being the first flag.

19. The computer-readable medium of claim 18, further comprising determining that the input code is the target code in response to the input flag being the second flag.

20. The computer-readable medium of claim 18, further comprising identifying a network identification code from the input code after determining that the input code is the target code, the network identification code being code for identifying the network commodity group data.

* * * * *